United States Patent
Teague

(10) Patent No.: US 12,312,938 B2
(45) Date of Patent: May 27, 2025

(54) METHODS AND MEANS FOR MEASURING MULTIPLE CASING WALL THICKNESSES USING X-RAY RADIATION IN A WELLBORE ENVIRONMENT

(71) Applicant: Philip Teague, Spring, TX (US)

(72) Inventor: Philip Teague, Spring, TX (US)

(73) Assignee: Visuray Intech Ltd (BVI), Road Town (VG)

( * ) Notice: Subject to any disclaimer, the term of this patent is extended or adjusted under 35 U.S.C. 154(b) by 0 days.

(21) Appl. No.: 18/111,244

(22) Filed: Feb. 17, 2023

(65) Prior Publication Data

US 2023/0203936 A1 Jun. 29, 2023

Related U.S. Application Data

(63) Continuation of application No. 17/223,660, filed on Apr. 6, 2021, now abandoned, which is a continuation
(Continued)

(51) Int. Cl.
*E21B 47/00* (2012.01)
*E21B 47/002* (2012.01)
(Continued)

(52) U.S. Cl.
CPC ........ *E21B 47/0025* (2020.05); *E21B 47/002* (2020.05); *E21B 47/017* (2020.05); *G01N 21/63* (2013.01); *G01V 5/12* (2013.01)

(58) Field of Classification Search
CPC .......... E21B 47/006; E21B 47/00; G01V 5/12
See application file for complete search history.

(56) References Cited

U.S. PATENT DOCUMENTS

| 5,627,368 A | 5/1997 | Moake | |
|---|---|---|---|
| 9,002,648 B2 * | 4/2015 | Pfutzner | .......... G01V 1/16 |
| | | | 702/6 |

(Continued)

FOREIGN PATENT DOCUMENTS

| WO | 2015112118 A1 | 7/2015 |
|---|---|---|
| WO | 2016053344 A1 | 4/2016 |
| WO | 2016153524 A1 | 9/2016 |

OTHER PUBLICATIONS

PCT International Search Report mailed Aug. 19, 2019 for corresponding PCT Application No. PCT/US2019/033083 filed May 20, 2019; 4 pages.

*Primary Examiner* — Catherine Loikith
(74) *Attorney, Agent, or Firm* — Adams & Reese LLP; John Henry Scott, III

(57) ABSTRACT

An x-ray based cased wellbore simultaneous tubing and casing measurement tool includes at least an x-ray source; a radiation shield to define the output from of the produced x-rays; a two-dimensional per-pixel collimated imaging detector array; a secondary two-dimensional per-pixel collimated imaging detector array; a plurality of parallel hole collimators formatted such in one direction so as to form a pinhole in another direction; sonde-dependent electronics; and a plurality of tool logic electronics and PSUs. A method of using an x-ray based cased wellbore simultaneous tubing and casing measurement tool includes at least producing x-rays in a shaped output; measuring the intensity of backscatter x-rays returning from materials surrounding the wellbore; determining the inner and outer diameters of tubing and casing from the backscatter x-rays; and converting image data from detectors into consolidated images of the tubing and casing.

18 Claims, 3 Drawing Sheets

Related U.S. Application Data of application No. 16/416,904, filed on May 20, 2019, now abandoned.

(60) Provisional application No. 62/673,294, filed on May 18, 2018.

(51) Int. Cl.
*E21B 47/017* (2012.01)
*G01N 21/63* (2006.01)
*G01V 5/12* (2006.01)

(56) References Cited

U.S. PATENT DOCUMENTS

| | | |
|---|---|---|
| 9,817,152 B2 | 11/2017 | Sofienko et al. |
| 10,677,958 B2 * | 6/2020 | Teague .................. E21B 49/00 |
| 2009/0147907 A1 | 6/2009 | Wraight |
| 2010/0017134 A1 | 1/2010 | Steinman et al. |
| 2014/0126331 A1 * | 5/2014 | Skinner .................. G01V 1/40 367/81 |
| 2016/0282505 A1 * | 9/2016 | Lee ....................... G01V 5/125 |

* cited by examiner

METHODS AND MEANS FOR MEASURING MULTIPLE CASING WALL THICKNESSES USING X-RAY RADIATION IN A WELLBORE ENVIRONMENT

TECHNICAL FIELD

The present invention relates generally to methods and means for monitoring and simultaneously determining tubing, liner and/or casing thicknesses within wellbore environments and in a particular though non-limiting embodiment to methods and means for inspecting side-wall milled windows, side pocket mandrels and perforations.

BACKGROUND

Within the oil & gas industry, accurately assessing the quality of tubing is extremely important. The industry currently employs several previously known methods for determining the quality of casing. Typically, calipers or cameras are employed to determine whether the casing/tubing is cylindrical and or not-corroded. However, cameras require the wellbore to contain optically clear fluids, otherwise they are incapable of distinguishing features within the fluid/borehole. More recently, ultra-sonic tools are run within the well in an attempt to image the casing/tubing, or elements outside of the tubing, such as the parts of a downhole safety valve. However, ultrasonic tools are model dependent, so prior knowledge of the precise makeup and status of the well is typically required for the ultrasound data to be compared against.

The prior art teaches a variety of techniques that use x-rays or other radiant energy to inspect or obtain information about the structures within or surrounding the borehole of a water, oil or gas well, yet none teach of a method to use the first order detectors (that are typically used to compensate for mud-cake/fluid variations) to create a photograph-like image of the casing itself. For example, US 2019/0063209 by Teague teaches an x-ray-based cement evaluation tool for determining whether a cement bond exists between the casing and cement of a cemented borehole, the tool including at least: an internal length comprising a sonde section, wherein said sonde section further comprises an x-ray source; a radiation shield for radiation measuring detectors; arrayed pixelated detectors; sonde-dependent electronics; and a plurality of tool logic electronics and PSUs.

US 2019/0049621 by Teague et al. teaches an x-ray based cement evaluation tool for measurement of the density of material volumes within single, dual and multiple-casing wellbore environments, wherein the tool uses x-rays to illuminate the formation surrounding a borehole, and a plurality of detectors are used to directly measure the density of the cement annuli and any variations in density within. The tool uses x-rays to illuminate the casing surrounding a borehole and a plurality of multi-pixel imaging detectors directly measure the thickness of the casing.

US 2019/0048709 by Teague et al. teaches an x-ray-based cased wellbore environment imaging tool, the tool including at least an x-ray source; a radiation shield to define the output faun of the produced x-rays; a direction controllable two-dimensional per-pixel collimated imaging detector array; sonde-dependent electronics; and a plurality of tool logic electronics and PSUs.

U.S. Pat. No. 7,675,029 to Teague teaches an apparatus that permits the measurement of x-ray backscattered photons from any horizontal surface inside of a borehole using two-dimensional imaging techniques.

U.S. Pat. No. 7,705,294 to Teague teaches an apparatus that measures backscattered x-rays from the inner layers of a borehole in selected radial directions, with the missing segment data being populated through movement of the apparatus through the borehole. The apparatus permits generation of data for a two-dimensional reconstruction of the well or borehole.

U.S. Pat. No. 8,481,919 to Teague teaches a method of producing Compton-spectrum radiation in a borehole without the use of radioactive isotopes, and further describes rotating collimators around a fixed source installed internally to the apparatus. It further teaches of the use of conical and radially symmetrical anode arrangements to permit the production of panoramic x-ray radiation.

U.S. Pat. No. 3,564,251 to Youmans discloses an azimuthally scanning collimated x-ray beam used to produce an attenuated signal at a detector for the purpose of producing a spiral-fouled log of the inside of a casing or borehole surface immediately surrounding the tool. However, the fails to disclose any means or method to create a photo-like image other than a two-dimensional radial plot on an oscilloscope.

U.S. Pat. No. 7,634,059 to Wraight discloses an apparatus used to produce individual two-dimensional x-ray images of the inner surface inside of a borehole using a single pin-hole camera without the technical possibility to ascertain the azimuth of the image being taken, such that a tessellation/stitching of multiple images is not taught.

In addition, U.S. Pat. No. 7,634,059 fails to disclose any method or means that could be used to log (i.e., actively move) the tool axially so that a consolidated image of the inside of the casing may be created.

US 2013/0009049 to Smaardyk discloses an apparatus that allows measurement of backscattered x-rays from the inner layers of a borehole. However, the reference fails to provide any means or method to create photo-like two dimensional images of the inner surfaces of the casing while the tool is being axially moved ('logged') through the wellbore so that a consolidated two dimensional image of the well casing can be produced.

U.S. Pat. No. 8,138,471 to Shedlock discloses a concept for a scanning-beam apparatus based on an x-ray source, a rotatable x-ray beam collimator, and solid-state radiation detectors enabling the imaging of only the inner surfaces of borehole casings and pipelines. However, the reference fails to disclose any means—or method to create photo-like two dimensional images of the inner casing surfaces of the casing while the tool is being axially moved ("logged") through the wellbore so that a consolidated two-dimensional image of the well casing can be produced.

U.S. Pat. No. 5,326,970 to Bayless discloses a concept for a tool that aims to measure backscattered x-rays azimuthally in a single direction to measure formation density, with the x-ray source being based on a linear accelerator. However, the reference fails to disclose any means or method to create photo-like two dimensional images of the inner surfaces of the inner surfaces of the casing while the tool is being axially moved through the wellbore so that a consolidated two dimensional image of the well casing can be produced.

U.S. Pat. No. 5,081,611 to Hornby discloses a method of back projection used to determine acoustic physical parameters of an earth formation longitudinally along the borehole using a single ultrasonic transducer and a number of receivers distributed along the primary axis of the tool.

U.S. Pat. No. 6,725,161 to Hillis discloses a method of placing a transmitter in a borehole and a receiver on the surface of the earth, or a receiver in a borehole and a transmitter on the surface of the earth, in order to determine structural information regarding the geological materials between the transmitter and receiver.

U.S. Pat. No. 6,876,721 to Siddiqui discloses a method to correlate information taken from a core-sample with information obtained from a borehole density log. The core-sample information is derived from a CT scan of the core-sample wherein the x-ray source and detectors are located on the outside of the sample, thereby configuring the system as an outside-looking-in arrangement. Various kinds of information from the CT scan such as its bulk density is compared to and correlated with the log information.

U.S. Pat. No. 4,464,569 to Flaum discloses a method of determining the elemental composition of earth formations surrounding a well borehole by processing detected neutron capture gamma radiation emanating from the earth formation after neutron irradiation of the earth formation by a neutron spectroscopy logging tool.

U.S. Pat. No. 4,433,240 to Seeman discloses a borehole logging tool that detects natural radiation from the rock of the formation and logs said information so that it may be represented in an intensity versus depth plot format.

U.S. Pat. No. 3,976,879 to Turcotte discloses a borehole logging tool that detects and records the backscattered radiation from the formation surrounding the borehole by means of a pulsed electromagnetic energy or photon source so that characteristic information may be represented in an intensity versus depth plot format.

U.S. Pat. No. 6,078,867 to Plumb discloses a method for generating a three-dimensional graphical representation of a borehole, comprising the steps of: receiving caliper data relating to the borehole, generating a three-dimensional wire mesh model of the borehole from the caliper data, and color mapping the three-dimensional wire mesh model from the caliper data based on either borehole form, rigosity and/or lithology.

SUMMARY

An x-ray-based cased wellbore simultaneous tubing and casing measurement tool including at least a source collimator located cylindrically around an X-ray source with a plurality of collimated per-pixel collimated imaging detector arrays, wherein said collimators are formed as pinholes in the transverse direction and a parallel hole collimator sets in the axial direction, and said tools includes at least an x-ray source; a radiation shield to define the output from of the produced x-rays; a two-dimensional per-pixel collimated imaging detector array; a secondary two-dimensional per-pixel collimated imaging detector array; a plurality of parallel hole collimators formatted such in one direction so-as to form a pinhole in another direction; sonde-dependent electronics; and a plurality of tool logic electronics and power source units (PSUs).

A method of using an x-ray-based cased wellbore simultaneous tubing and casing measurement tool including a source collimator located cylindrically around an X-ray source with a plurality of collimated per-pixel collimated imaging detector arrays, wherein said collimators are formed as pinholes in the transverse direction and a parallel hole collimator sets in the axial direction, the method including at least producing x-rays in a shaped output; measuring the intensity of backscatter x-rays returning from materials surrounding the wellbore; determining the inner and outer diameters of tubing and casing from the backscatter x-rays; and converting image data from said detectors into consolidated images of the tubing and casing.

BRIEF DESCRIPTION OF THE DRAWINGS

FIG. 3A and FIG. 3B illustrate how an arrangement of scintillators coupled to photomultiplier tubes or photodiodes may be used to determine the thickness of the outer casing.

BRIEF DESCRIPTION OF SEVERAL EXAMPLE EMBODIMENTS

The example methods and means disclosed herein for determining casing and tubing integrity while simultaneously performing casing integrity evaluations located immediately surrounding the borehole through x-ray backscatter imaging in a cased wellbore environment, is embodied in a package configured so as to not require direct physical contact with the well casings (i.e., non-padded). The methods and means disclosed herein further employ a combination of collimators located cylindrically around an X-ray source, located within a non-padded concentrically-located borehole logging tool, together with axially offset arrangements of a plurality of fixed three-dimensional hybrid collimated imaging detector array(s) to also be used as the primary imaging detector(s). The capability of control the solid angle of the collimated source permits the operator to either log the tool through the well casing while the detectors measure the inner diameter and outer diameter of tubing or casing, and/or to produce a fully azimuthal two dimensional backscatter x-ray image, or to hold the tool stationary as the collimated detectors image azimuthally to capture a cylindrical image that can be improved upon 'statically' (as the detector continues to recapture casing images that can be added to the existing image set).

Figure 1:
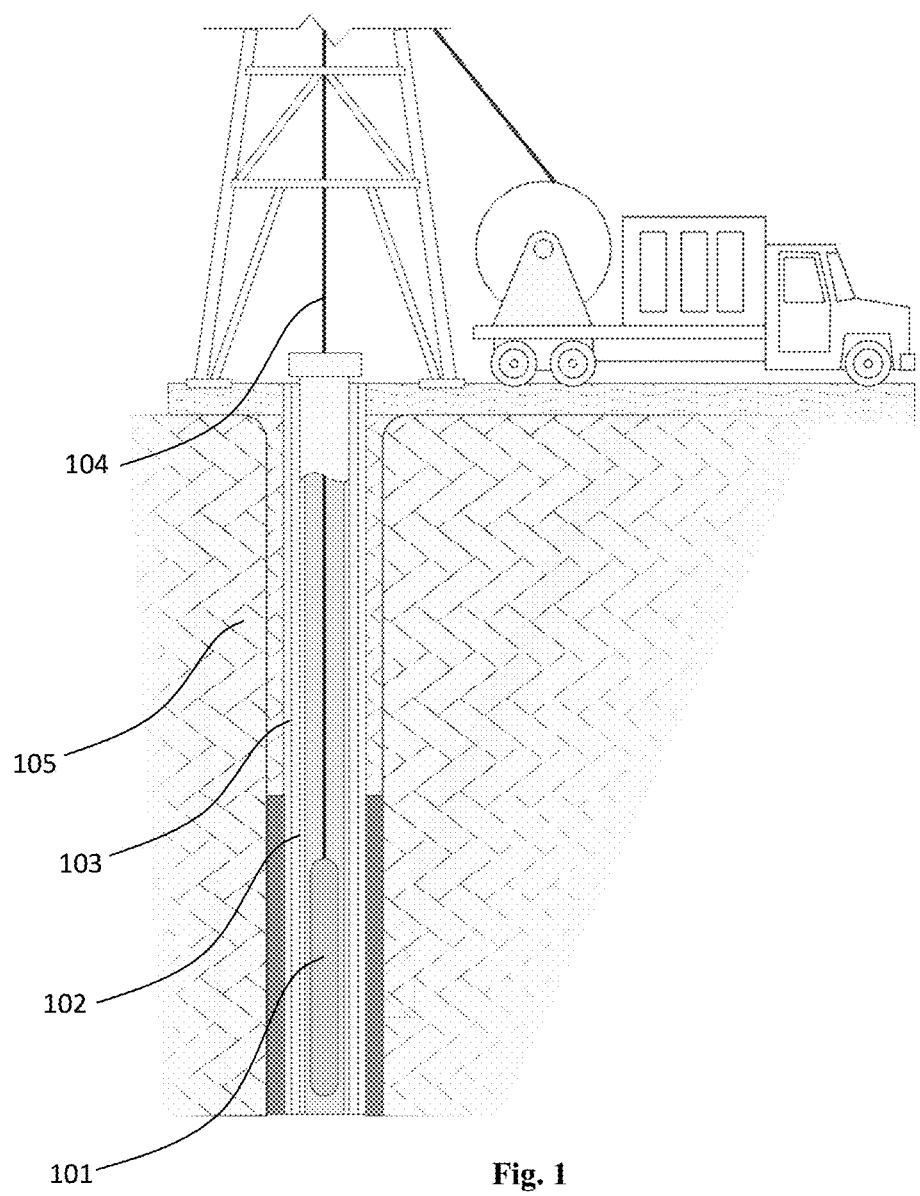
FIG. 1 illustrates an x-ray-based tubing and casing measurement tool being deployed into a borehole via wireline conveyance. Regions of interest within the materials surrounding the borehole are also indicated.

With reference now to the attached drawings, FIG. 1 illustrates an example embodiment an x-ray-based tubing imaging tool [101] is deployed by wireline conveyance [104] into a tubing [102] within a cased [103] borehole, wherein the tubing [102] is imaged simultaneously with the well casing [103] that is cemented into the formation [105]. The tool is enclosed by a pressure housing [201] which ensures that well fluids are maintained outside of the housing.

Figure 2A:
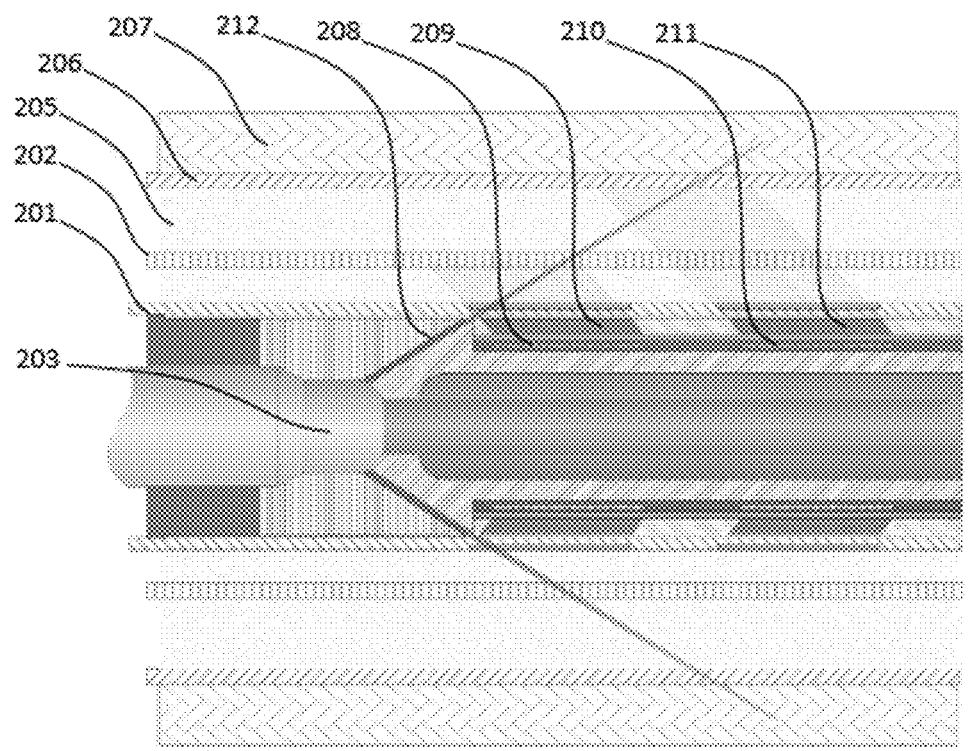
FIG. 2A illustrates an axial cross-sectional view of an example embodiment of an x-ray-based tubing and casing measurement tool arranged so as to enable imaging of the inner-most casing or tubing and outer casing.
Figure 2B:
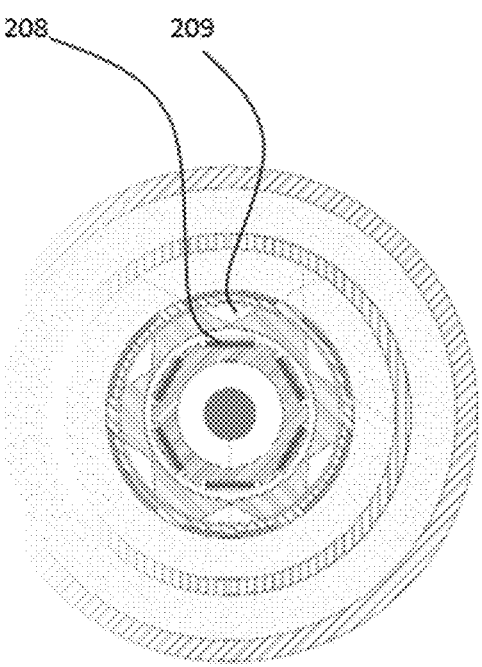
FIG. 2B illustrates a transverse cross-sectional view of the example embodiment of the x-ray-based tubing and casing measurement tool of FIG. 2A.

FIG. 2A and FIG. 2B illustrate pressure housing [201] conveyed through a well tubing [202]. The pressure housing contains an electronic x-ray source [203] which is configured to produce x-rays panoramically in a conical output [212]. The conical x-ray beam [212] illuminates a cylindrical section of the tubing [202], the annular fluids outside of the tubing [205], the next casing [206], and the surrounding cement [207]. The radiation scattering from the tubing is imaged by a near-field group of azimuthally arranged plurality of two-dimensional detector arrays [208], which are collocated with three-dimensional parallel hole collimators [209]. The three-dimensional parallel hole collimators [209] reduce the field of view of each pixel of the detector array such that each pixel images a distinct and unique section of the illuminated tubing [202]. The radiation scattering from the casing [206] is imaged by a far-field group of azimuthally arranged plurality of two-dimensional detector arrays [210], which are collocated with three-dimensional parallel hole collimators [211]. The three-dimensional parallel hole collimators [211] reduce the field of view of each pixel of the detector array such that each pixel images a distinct and unique section of the illuminated casing [206]. The collimators are formed such that, in the transverse direction, they thin' the geometry of a typical pinhole detector, however, in the axial-radial direction they form the geometry of a plurality of parallel hole collimators. The tool is then arranged such that the narrow conical beam [212] intersects the tubing or casing and can be used to measure the thickness of the tubing or casing precisely. As the axial offset for each pixel is known, along with the angle and field-of-view of the collimator and the angle and divergence of the beam, each pixel can be easily remapped to a radially positioned voxel along the beam-path.

In a further embodiment, the tool is arranged such that the narrow conical beam intersects the tubing or casing and is used to measure the thickness of the tubing or casing precisely, in addition to the thickness of scale deposits on the inner-diameter of the tubing/casing. As the axial offset for each pixel is known, along with the angle and field-of-view of the collimator and the angle and divergence of the beam, each pixel is easily remapped to a radially positioned voxel along the beam-path.

Figure 3A:
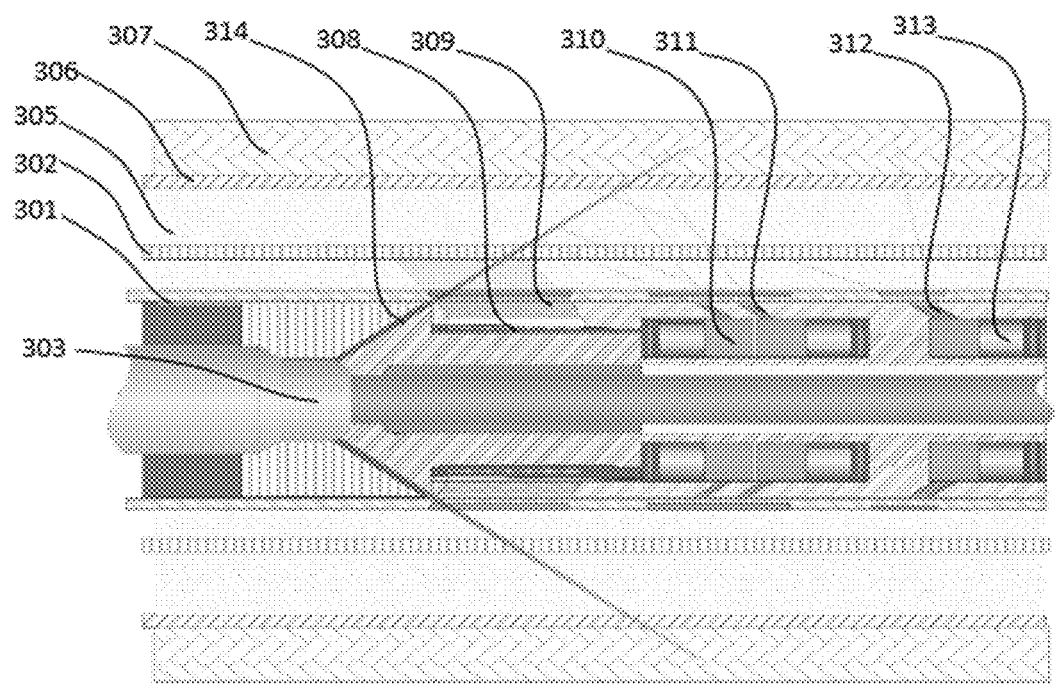
FIG. 3A illustrates an axial cross-sectional view of an example embodiment of an x-ray-based tubing and casing measurement tool, arranged such as to enable imaging of the inner-most casing or tubing and 10 outer casing.
Figure 3B:
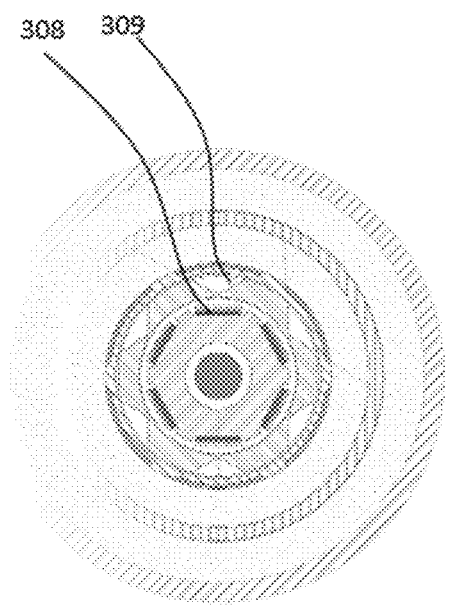
FIG. 3B illustrates a transverse cross-sectional view of the example embodiment of the x-ray-based tubing and casing measurement tool of FIG. 3A.

In another embodiment, FIG. 3A and FIG. 3B illustrate that a pressure housing [301] is conveyed through a well tubing [302]. The pressure housing contains an electronic x-ray source [303] configured to produce x-rays panoramically in a conical output [314]. The conical x-ray beam [314] illuminates a cylindrical section of the tubing [302], the annular fluid volume [305] outside of the tubing [302], the next casing [306], and the surrounding cement [307]. The radiation scattering from the tubing is imaged by a near-field group of azimuthally arranged plurality of two-dimensional detector arrays [308], which are collocated with three-dimensional parallel hole collimators [309]. The three-dimensional parallel hole collimators [309] reduce the field of view of each pixel of the detector array such that each pixel images a distinct and unique section of the illuminated tubing [302]. The radiation scattering from the casing [306] is imaged by a far-field group of an azimuthally arranged plurality of scintillator crystals attached to photo-multiplier tubes and/or photodiodes [310], that are collimated using three-dimensional parallel hole collimators [311] such that each axially offset detector receives scattered radiation from a similar region to the other detectors on a similar azimuthal plane. This approach allows multiple views of the same annular fluid volume [305] such that the density and thickness of the annular fluid volume can be computed from the received counts (in each detector) and the casing thickness can be inferred from the subtraction of radial thickness of the annular fluid volume from the known outer dimension of the casing. A further long-space' detector [313] is collimated using three-dimensional parallel hole collimators [312] such that the received scattered photons emanate from the casing and cement interface region, such that any variation in response not noted by the annular fluid detector group would be the result of variations in the outer-diameter of the casing.

In a further embodiment, the axial length of the imaging detector group is increased such that an additional casing, such as a second casing outside of the initial tubing and first casing, can be interrogated for the purposes of measuring the inner and outer diameters of the metal volume.

In a further embodiment, an additional imaging detector group is added with a larger axial offset from the source, such that an additional casing, such as a second casing outside of the initial tubing and first casing, can be interrogated for the purposes of measuring the inner and outer diameters of the metal volume.

In a further embodiment, additional imaging detector groups are added with a larger axial offsets from the source, such that multiple additional casings are interrogated for the purposes of measuring the inner and outer diameters of the metal volumes.

In another embodiment, as the tool is logged axially, each axial 'column' of pixels of the detector arrays is sampled such that each column would image a similar section of the casing/tubing that had been imaged by its neighbor prior during the last sample. Upon encoding the images with the known azimuthal capture position of the image section, the separate image pixel columns associated with each imaged 'slit' section of the casing/tubing can be summated/averaged to produce a higher quality image within a single pass.

In a further embodiment, the operator stops the conveyance of the tool and uses the azimuthal imaging detector assembly to continually sample the same images tubing/casing illuminated cylinder section, such that the resulting data set can build/summate statistically to improve image quality.

In another embodiment, the backscatter images also contains spectral infatuation, such that a photo-electric or characteristic-energy measurement may be taken, such that the imaged material is analyzed for scale-build up or casing corrosion.

In a further embodiment, machine learning is employed to automatically analyze the spectral (photo electric or characteristic energy) content of the images to identify key features, such as corrosion, holes, cracks, scratches, and/or scale-buildup.

In a further embodiment, the per-pixel collimated imaging detector array is a single 'strip' array, i.e., one pixel wide azimuthally, and multiple pixels long axially—the imaging result is a 'cylindrical' ribbon image. The tool is then moved axially (either by wireline-winch or with a stroker) and a new image set taken, such that a section of casing could be imaged by stacking cylindrical ribbon images/logs.

In a further embodiment, machine learning is employed to automatically reformat (or re-tesselate) the resulting images as a function of depth and varying logging speeds or logging steps, such that the finalized casing and/or cement image is accurately correlated for azimuthal direction and axial depth by comparing with CCL, wireline run-in measurements, and/or other pressure/depth data.

The foregoing specification is provided only for illustrative purposes, and is not intended to describe all possible aspects of the present invention. While the invention has herein been shown and described in detail with respect to several exemplary embodiments, those of ordinary skill in the art will appreciate that minor changes to the description, and various other modification, omissions and additions may also be made without departing from the spirit or scope thereof.

The invention claimed is:

1. An x-ray-based cased wellbore simultaneous tubing and casing measurement tool comprising:
    an x-ray source to produce x-rays in a shaped output;
    a plurality of collimated per-pixel imaging detector arrays that includes:
        a first set of two-dimensional per-pixel collimated imaging detector arrays; and
        a second set of two-dimensional per-pixel collimated imaging detector arrays; and
    three-dimensional collimators collocated with the plurality of collimated per-pixel imaging detector arrays, wherein the three-dimensional collimators are formed as pinholes in a transverse direction and as parallel hole collimators in an axial direction that is orthogonal to the transverse direction.

2. The tool of claim 1, wherein the plurality of collimated imaging detector arrays comprise a single strip array that is one pixel wide and multiple pixels long.

3. The tool of claim 1, wherein the plurality of collimated imaging detector arrays comprise a plurality of collimated scintillator-based imaging detector arrays.

4. The tool of claim 1, wherein images contain spectral information to inform characteristics of any wellbore materials or debris.

5. The tool of claim 1, wherein the tool is configured so as to permit through-wiring.

6. The tool in claim 1, wherein the tool is combinable with other measurement tools comprising one or more of acoustic or ultrasonic measurement tools.

7. The tool in claim 1, wherein the tool is used to determine an inner diameter of a tubing or casing.

8. The tool in claim 1, wherein the tool is used to determine an outer diameter of a tubing or casing.

9. The tool in claim 1, wherein the tool is used to determine a distribution and inner diameter of a scale upon an inner diameter of a tubing or casing.

10. The tool in claim 1, wherein the tool is used to determine a position, distribution and area of perforations within casings surrounding the cased wellbore.

11. The tool in claim 1, wherein machine learning is employed to automatically reformat or re-tesselate resulting images as a function of depth and varying logging speeds or logging steps.

12. A method of using an x-ray-based cased wellbore simultaneous tubing and casing measurement tool, the method comprising:
    producing x-rays in a shaped output using an x-ray source of the tool;
    measuring an intensity of backscatter x-rays returning from materials surrounding a wellbore using a plurality of collimated per-pixel imaging detector arrays of the tool, wherein the plurality of collimated per-pixel imaging detector arrays include first and second sets of two-dimensional per-pixel collimated imaging detector arrays, wherein the plurality of collimated per-pixel imaging detector rays are collocated with three-dimensional collimators of the tool, and wherein the three-dimensional collimators are formed as pinholes in a transverse direction and as parallel hole collimators in an axial direction that is orthogonal to the transverse direction;
    determining inner and outer diameters of tubing and casing from the backscatter x-rays; and
    converting image data from the plurality of collimated per-pixel imaging detector arrays into consolidated images of the tubing and casing.

13. The method of claim 12, wherein the plurality of collimated imaging detector arrays comprise a single strip array that is one pixel wide and multiple pixels long.

14. The method of claim 12, wherein the consolidated images contain spectral information to inform characteristics of any wellbore materials or debris.

15. The method of claim 12, wherein the tool is combinable with other measurement tools comprising one or more of acoustic or ultrasonic measurement tools.

16. The method of claim 12, further comprising:
    using the consolidated images to determine a distribution and inner diameter of a scale upon the inner diameter of a tubing or casing.

17. The method of claim 12, further comprising:
    using the consolidated images to determine a position, distribution and area of perforations within the casings surrounding the cased wellbore.

18. The method of claim 12, wherein machine learning is employed to automatically reformat or re-tesselate resulting images, as a function of depth and varying logging speeds or logging steps.

* * * * *